United States Patent [19]

Davis

[11] 4,003,530

[45] Jan. 18, 1977

[54] PNEUMATIC COURIER DISCHARGE UNIT

[76] Inventor: Orin H. Davis, 6620 N. 16th Drive, Phoenix, Ariz. 85015

[22] Filed: Aug. 13, 1975

[21] Appl. No.: 604,302

[52] U.S. Cl. .................................. 243/20; 243/23; 243/24

[51] Int. Cl.[2] ......................................... B65G 51/30

[58] Field of Search ............. 243/1, 19, 20, 23, 24, 243/38, 16 R, 16 M, 21, 22, 36

[56] References Cited

UNITED STATES PATENTS

| 742,819 | 11/1903 | Anderson | 243/23 |
|---|---|---|---|
| 933,527 | 9/1909 | Brown | 243/23 |
| 944,487 | 12/1909 | Jennings | 243/23 |
| 1,031,866 | 7/1912 | Pearsall | 243/19 |
| 1,695,785 | 12/1928 | Stoetzel | 243/22 X |
| 1,849,119 | 3/1932 | Stoetzel | 243/23 |
| 2,353,870 | 7/1944 | Blume | 243/16 R |

Primary Examiner—Johnny D. Cherry
Assistant Examiner—James L. Rowland
Attorney, Agent, or Firm—Cahill, Sutton & Thomas

[57] ABSTRACT

In pneumatic systems for propelling couriers through conduits, a discharge unit employs the momentum of the propelled courier to establish a cushion of air under pressure, which cushion retards the velocity of the courier prior to its discharge. A counter balanced latched hinged plate attached at the outlet of the discharge unit is released by the courier to effect its discharge.

5 Claims, 6 Drawing Figures

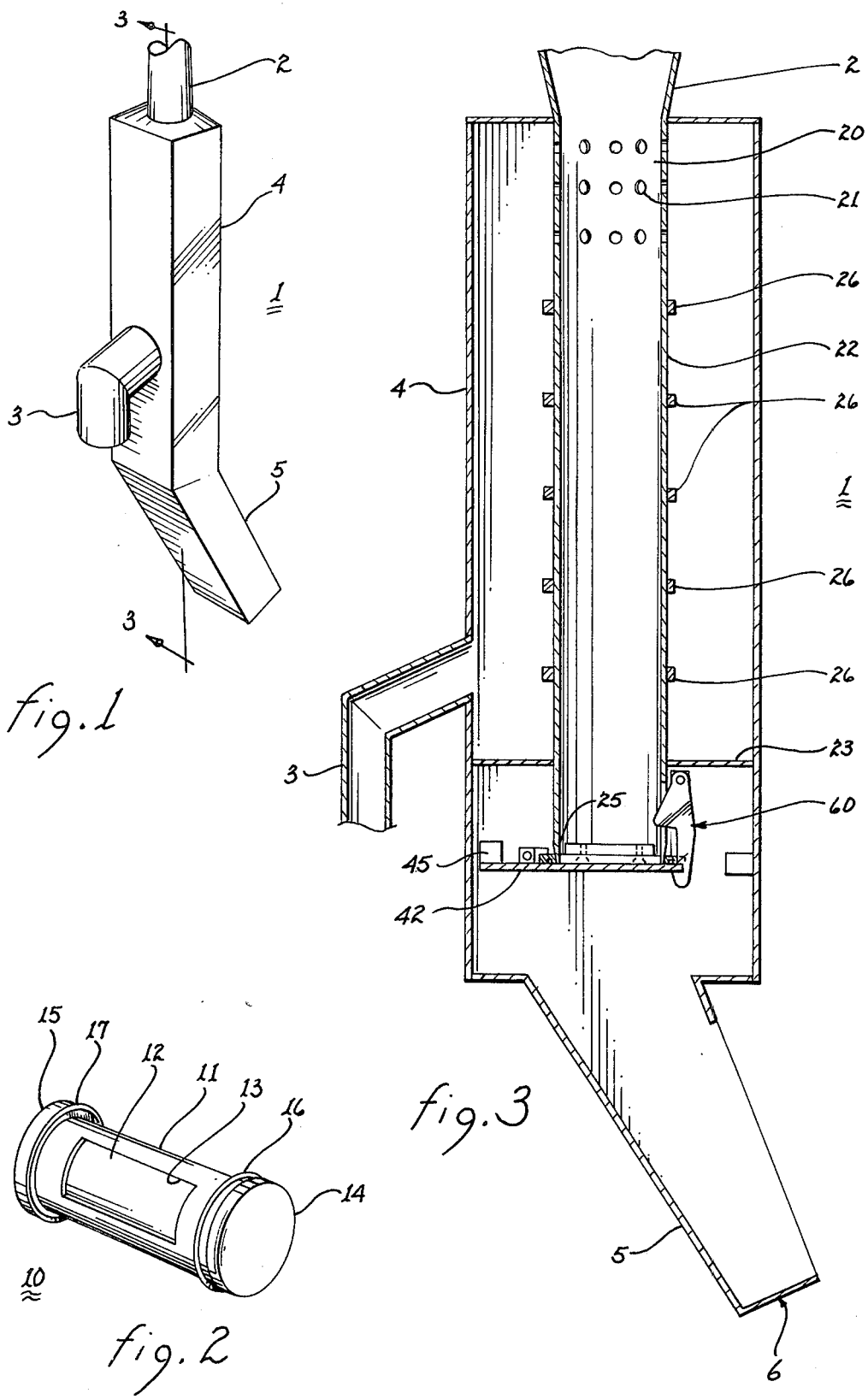

PNEUMATIC COURIER DISCHARGE UNIT

The present invention relates to pneumatic courier systems and, more particularly, to discharge units for couriers.

Pneumatic courier systems, per se, have been in use for many decades. Their popularity decreased to some extent with the advent of electric teletype systems and other electrical and electronic interoffice communication systems. Moreover, pneumatic systems, as a group, due to the heretofore necessary and attendant air leakage noise, noise of the transported couriers, the clanking and clanging at both receiving and discharging stations, blasts of air at the receiving and discharge stations during insertion or removal of couriers and the need for extensive, continuing and expensive maintenance problems, were considered unsuitable for use in most modern office environments.

Of the many patents which have been granted and pertain to pneumatic courier systems, the following are particularly relevant with respect to the invention to be described. German Pat. No. 560,661, issued Sept. 15, 1932, illustrates a downwardly oriented vertical tube having a pair of stepped inwardly directed flanges for momentarily engaging and dissipating the kinetic energy of each of the discharging couriers. As the couriers approach the discharge outlet, a mechanical switch is tripped to generate an electrical signal indicative of the passage of a courier; a pivotable plate extending across the outlet of the discharge conduit, pivots as a result of a courier bearing thereagainst and generates a further electrical signal indicative of the discharging courier. U.S. Pat. No. 664,547, issued Dec. 25, 1900, discloses a selectively operated conduit energized by the insertion of a courier into a receiving station thereof; at the discharge station, the courier is expelled from the conduit and drops into a receiving chamber, wherein a momentary air pressure buildup is established to operate a valve for terminating further air flow through the conduit. U.S. Pat. No. 683,387, issued Sept. 24, 1901, discloses a highly complex and multi-element courier dispatch station which precludes the dispatch station from being vertically oriented. U.S. Pat. No. 680,698, issued Aug. 20, 1901, is directed to a courier discharge apparatus which pivots to discharge the courier to one of a plurality of selectable stations. U.S. Pat. No. 730,715, issued June 9, 1903, discloses a courier discharge unit having a spring mounted end plate for arresting travel of a courier. U.S. Pat. No. 2,710,728, issued June 14, 1955, is directed to a pneumatic courier system having bypass channels to prevent traffic congestion.

A thread of commonality exists in each of the above described stations for receiving couriers; that is, the motion of the couriers is stopped abruptly. The abrupt stopping necessarily creates noise which will distract the occupants of any working positions in proximity to the courier discharge stations. Furthermore, maintenance and/or repair of the receiving stations is exacerbated by mechanical or electromechanical elements located within the conduit or within other equally poorly accessible locations.

It is therefore a primary object of the present invention to provide an essentially noiseless discharge unit for pneumatically operated courier systems.

Another object of the present invention is to provide an essentially maintenance free discharge unit for pneumatically operated courier systems.

Yet another object of the present invention is to provide an automatic air pressure buildup for retarding the velocity of a courier arriving at a discharge unit.

Still another object of the present invention is to provide a self-opening and self-closing outlet within a courier discharge unit.

A further object of the present invention is to provide non-fatiguing biasing elements for automatically closing the outlet within a courier discharge unit.

A yet further object of the present invention is to provide a courier discharge unit which does not impair the air flow through the courier system during discharge of a courier.

A still further object of the present invention is to provide a courier discharge unit wherein all of the moving elements thereof are readily accessible for repair or replacement at the outlet of the courier discharge unit.

A still further object of the present invention is to provide adjustment means for maintaining an air seal to inhibit air leakage through a courier discharge unit.

These and other objects of the present invention will become apparent to those skilled in the art as the description thereof proceeds.

The present invention may be described with greater specificity and clarity with reference to the following drawings, in which:

FIG. 1 is a perspective view of a discharge station incorporating a discharge unit constructed in accordance with the principles of the present invention.

FIG. 2 is a representation of a standard courier employable with the present invention.

FIG. 3 is a side view of a discharge station taken along lines 2—2, as shown in FIG. 1.

Figure 4:
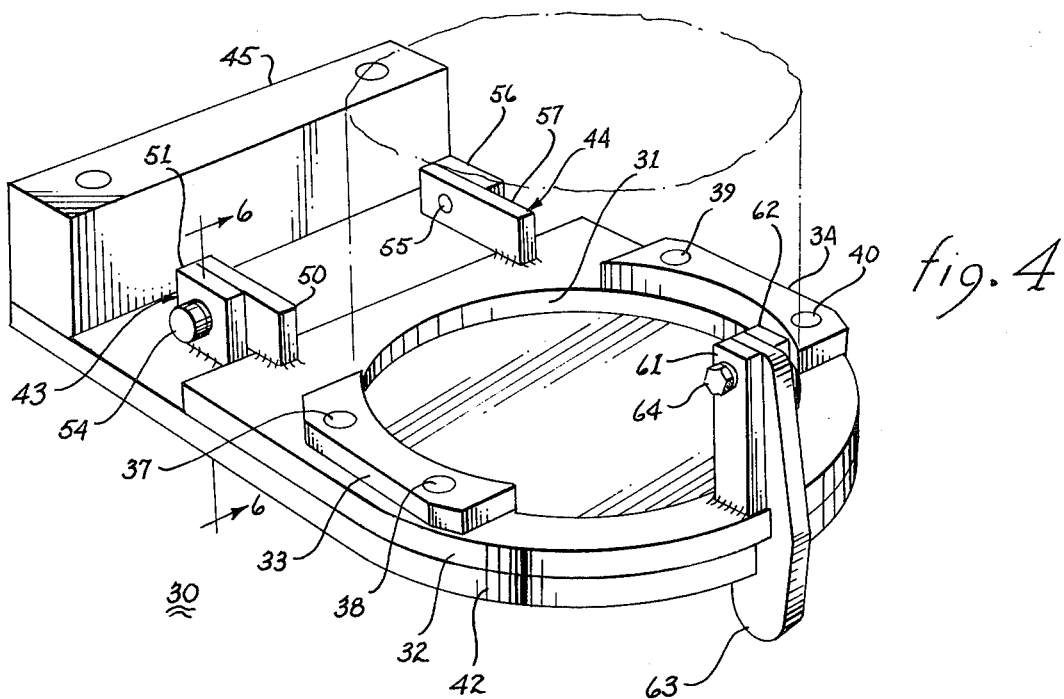
FIG. 4 is a detailed perspective view of the assembled components forming the gate mechanism at the outlet of a discharge unit.

Pneumatically operated courier systems employ one or more conduits intermediate two or more work positions. By means of a source of air under pressure or under partial vacuum, couriers are propelled through the conduits from one work position to another. Necessarily, each conduit, or each family of conduits, must be a closed system to the extent that sufficient air pressure be maintained within the conduit to effect passage therethrough of couriers. To preserve the air flow integrity of the courier receiving station, apparatus such as that disclosed in pending United States application, Ser. No. 551,307 and entitled "PNEUMATIC COURIER DISPATCH UNIT" may be employed. To maintain integrity of the air flow within a conduit at the courier discharge station, apparatus such as that described below and illustrated in the accompanying drawings may be employed.

Referring specifically to FIG. 1, there is illustrated a discharge station 1. The discharge station interconnects an input conduit 2 with an output conduit 3 with an air box 4. Apparatus disposed within the air box segregates the courier entering via input conduit 2 from the air stream flowing from the input conduit into output conduit 3 and discharges the courier into a receiving shoe 5.

Referring momentarily to FIG. 2, a general description of presently commercially available couriers 10 will be described. The courier is formed of an elongated cylinder 11 having a hatch 12 covering an access aperture 13. The closed ends of cylinder 11 are circumscribed by bumpers 14 and 15. These bumpers serve to guide the courier during its passage through a conduit and tend to muffle the noise of contact therebetween. A pair of annular seals 16 and 17 extend about cylinder 11 inwardly of bumpers 14 and 15, respectively. These seals serve to restrain air flow intermediate cylinder 11 and the surrounding conduit in order to establish an air pressure differential between the ends of the courier. As is well known, this air pressure differential provides the force necessary to propel the courier through a conduit. Nominally, the diameter of bumpers 14 and 15 is 4 inches and the diameter of seals 16 and 17 is approximately 4.25 inches.

The internal construction of discharge station 1 will be discussed with primary reference to FIG. 3. Nominally, the internal diameter of the conduit conveying a courier within the pneumatic system is 4 ⅜ inches. This diameter, in conjunction with seals 16 and 17 of a courier, establishes sufficient air pressure to drive the courier through the conduit without having the courier tend to bind as it traverses through curved sections of the conduit. The courier conveying conduit within the pneumatic system is attached to and empties into input conduit 2. The input conduit is necked downwardly from an internal diameter of 4 ⅜ inches to a diameter of 4.28 inches. This change in diameter has no appreciable effect in creating a back pressure buildup. The input conduit is formed as a part of or is attached to a conduit section 20, the latter having an internal diameter equivalent to the reduced diameter of the input conduit. The conduit section 20 extends into air box 4 from the lower end of input conduit 2 and is apertured with a plurality of apertures 21. These apertures, in the aggregate, are at least equivalent in area to the cross-sectional area of input conduit 2 to prevent back pressure buildup. A conduit section 22, which may be a part of conduit section 20 and is of the same diameter, extends downwardly from conduit section 20 into penetrating engagement with baffle 23. A plurality of compression rings 26 encircle conduit section 22. The sides and top surface of air box 4 in conjunction with a baffle 23 define an envelope circumscribing conduit sections 20 and 22. Output conduit 3 extends laterally from one of the sides of the air box and is in fluid communication with the envelope; its diameter is approximately 4 ⅜ inches to preclude a back pressure buildup. Thus, the air flowing through the input conduit 2 is directed through apertures 21 into the envelope and exhausts through output conduit 3. The cross-sectional area of the envelope defined by air box 4 is maintained sufficiently large to preclude any meaningful pressure drop losses which might otherwise restrict the rate of air flow therethrough.

Outlet 25 at the lower extremity of conduit section 22 is selectively closed by means of a pivotable plate assembly 30, as illustrated in FIG. 4. An aperture 31 of a collar 32 is in receiving engagement with the outer peripheral surface at the lower extremity of conduit section 22. The relationship between the dimensions of the aperture and the outer diameter of the lower extremity of the conduit section is such that an effective air seal is maintained therebetween. A pair of gibs 33 and 34 are welded to diametrically opposed outer surfaces of conduit section 22 in proximity to the lower extremity thereof. Pairs of flat head bolts 37, 38 and 39, 40, secure collar 32 to gibs 33 and 34, respectively. A plate 42 is pivotally attached to collar 32 by means of a pair of pivot assemblies 43 and 44. A counterweight 45 attached to plate 42 biases the plate into an essentially planar engagement with the lower surface of collar 32. An air seal is maintained intermediate collar 32 and plate 42 by an annular seal 46 disposed within a downwardly opening groove 47 circumscribing aperture 31 of collar 32.

Figure 6:
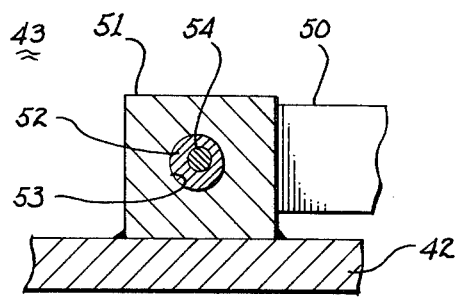
FIG. 6 is a side view of the adjustment means for ensuring an air tight seal at the outlet of a courier discharge unit taken along lines 6—6, as shown in FIG. 4.

To ensure complete circumferential engagement intermediate plate 42 and seal 46, pivot assemblies 43 and 44 have an eccentric collar supported by a bolt. These pivot assemblies will be described with particular reference to FIGS. 4 and 6. A bar 50 is welded onto collar 32 and extends rearwardly therefrom. An upwardly directed block 51 is welded to the upper surface of plate 42. An eccentric collar 52 is retained within an aperture 53 in block 51. A bolt 54 penetrates collar 52 and is in threaded engagement with bar 50; preferably, the head of bolt 52 is of a diameter less than the diameter of the collar in order to permit the collar to be drawn tightly against bar 50.

By loosening bolts 54 and 55 in pivot assemblies 43 and 44, respectively, the collars can be rotated to raise or lower blocks 51 and 56 with respect to bars 50 and 57. Thereby, the pivot point of plate 42 can be slightly altered upwardly and downwardly or forwardly and rearwardly in order to ensure that the plate contacts the circumference of seal 46. Even though the head of bolts 54 and 55 may be of lesser diameter than the apertures within blocks 51 and 56, sideways movement of plate 42 with respect to collar 32 is inhibited by the physical constraint imposed by bars 50 and 57.

Figure 5:
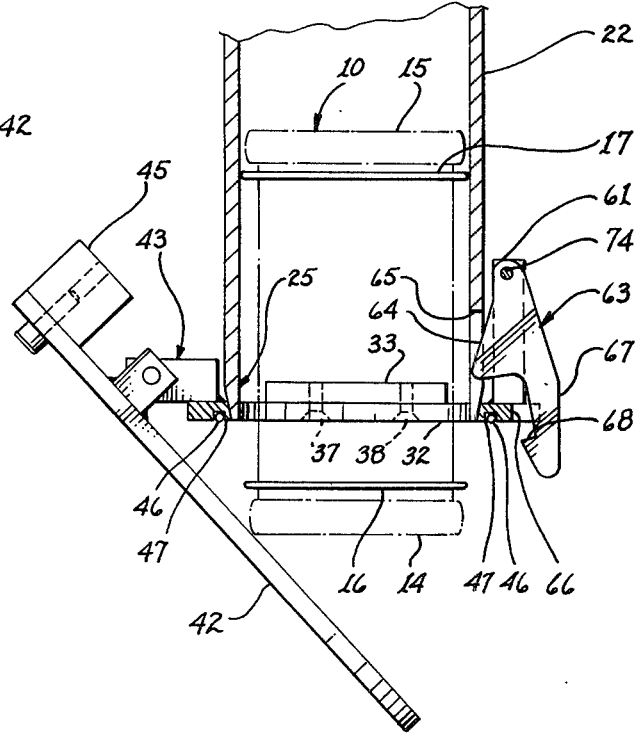
FIG. 5 is a side view of a courier discharge unit and illustrating partial passage of a courier therethrough.

The latch mechanism for releasing plate 42 to effect pivotal movement thereof is dependent upon the operation of latch assembly 60, as illustrated in FIGS. 3, 4 and 5. A pair of spaced apart posts 61 and 62 are welded to and extend upwardly from collar 32 at a point essentially diametrically opposed from pivot assemblies 43 and 44. A latch 63 is pivotally suspended from and intermediate posts 61 and 62 by a pin or bolt 74. A positionable eccentric collar may be disposed intermediate bolt 74 and latch 63 to accommodate adjustment of the pivot point as necessary to obtain minimum effort during latching and unlatching. The thickness of latch 63 is essentially equivalent to the spacing between the posts such that free pivotal movement may be effected and yet inhibit twisting or sideways sway of the latch. A lobe 64 extends toward the center of conduit section 22 to an extent sufficient to cause penetration of the wall of the conduit section through a slot 65 when the latch hangs freely. A further slot 66 is disposed within collar 32 to receive shank 67 of the latch and allow movement of lobe 64 into conduit section 22. A lip 68 of the latch is configured to engage the lower surface of plate 42 when the latter is positioned adjacent the under surface of collar 32. It may be appreciated that lip 68 will inhibit downward pivotal movement of plate 42 when the latch hangs downwardly and lobe 64 has penetrated slot 65.

The operation of the courier discharge unit will be described with primary reference to FIGS. 3 and 5. Assuming for the moment that a courier 10 is being transported from a conduit within the pneumatic system into input conduit 2 and propelled by a source of air under pressure; the air ahead of the courier will flow from the input conduit, into conduit section 20, through apertures 21 into the envelope within air box 4 and exhaust into output conduit 3. When the courier arrives at conduit section 20, it will continue into conduit section 22. The air pressure propelling the courier will not follow the courier into conduit section 22 but will flow into air box 4 through apertures 21 and thence be exhausted through output conduit 3. Hence, the propelling air pressure no longer acts upon the courier within conduit section 22 and only the momentum of the courier, in conjunction with gravity, maintains its continuing motion. At this point in time, plate 42 extends across outlet 25 and is latched in position by latch assembly 60 to define a sealed end of conduit section 22 and form a closed end cavity within the conduit section. Because input conduit 20 is necked or tapered from an I.D. of 4 ⅝ inches to an I.D. of approximately 4.28 inches, and conduit section 22 has an I.D. of 4.28 inches, air flow intermediate the courier and the walls of the conduit section as the courier travels toward outlet 25 is restricted. The restricted flow of bypass air will tend to compress the air intermediate the courier and outlet 25; that is, the air within the closed end cavity. The compressed air necessarily serves as a restraining force upon continuing downward movement of the courier and the velocity of the courier will decrease rapidly.

As the courier nears outlet 25 and comes into proximity of lobe 64 of latch assembly 60, its velocity is very low. Because lobe 64 extends internal to conduit section 22 through slot 65, seal 16 will come into engagement with a sloping surface of the lobe and force latch 63 to pivot outwardly about bolt 74. Outward pivotal movement of latch 63 will cause lip 68 to disengage from plate 42. On contact between bumper 14 of courier 10 and plate 42, the plate will be forced to pivot downwardly. The downward pivotal movement of the plate breaks the air seal intermediate the plate and seal 46 and the preexisting air pressure buildup will be dissipated. The plate, in response to the full weight of the courier, pivots downwardly through an angle sufficient to permit complete passage of the courier through outlet 25. After the courier clears outlet 25, it drops into shoe 5 and is retained therein by a lip 6 until it is manually removed.

As courier 10 drops into shoe 5, its contact with plate 42 ceases and the plate, in response to the bias created by counterweight 45, is free to pivot upwardly into planar reengagement with collar 32. Latch 63 is configured such that it will normally hang vertically downwardly from bolt 74 at which position lip 68 engages the lower surface of plate 42 to lock the plate in place. In the event latch 63 returns to its quiescent position prior to completion of the upward pivotal movement of plate 42, the lower extremity of the latch is configured so as to cause the latch to pivot outwardly in response to striking upward movement of plate 42 and permit the plate to become seated adjacent collar 32. The return pivotal movement of latch 63 positions lip 68 beneath the edge of plate 42 to secure the plate adjacent seal 46.

There are several subtleties to the presently described courier discharge unit which may not be immediately apparent from the drawings. In example, the continuing flow of air from input conduit 2 through apertures 21 into air box 4 and exhausting through output conduit 3, tends to create a slight pressure drop within conduit section 22. This pressure drop causes ambient pressure acting upon the exterior surface of plate 42 to force the plate against seal 46. Thus, the continuing air flow itself tends to increase the effectiveness of the seal at a courier discharge unit rather than decrease the air seal, as is true of prior art systems. Further, no coil springs, leaf springs, or piston and cylinder assemblies are employed which might become less effective with use; instead, a simple non-wearing counterweight system is employed. Moreover, the latch assembly has no springs and relies upon gravity for its necessary bias. Should maintenance ever be necessary on plate assembly 30, loosening of bolts 37, 38, 39 and 40 permits the whole assembly to be dropped and removed for the necessary repair or replacement. The other remaining elements within the courier discharge unit are not subject to wear and hence do not need to be maintained; therefore, input conduit 2, air box 4, and outlet conduit 3 can be permanently lodged within walls or superstructure as access thereto is not necessary for maintenance purposes. This capability renders the courier discharge unit installable at locations which are essentially inaccessible after installation, which capability, in turn, permits the unit to occupy otherwise useless floor or wall space.

Because courier 10 is de-accelerated within conduit section 22 by means of air pressure, little noise is created to effect such deceleration. The deceleration purposely restrains the courier from contacting the pivotal plate assembly with little more than a muffled thud due to the courier's low velocity at the time of contact and the muffling qualities of the courier bumpers. The drop of the courier into the shoe is likewise well muffled. Hence, the noise created within the courier discharge unit on receipt of a courier is too sufficiently insignificant to cause any disturbance to proximate work positions.

The uninterrupted air flow intermediate input conduit 2 and output conduit 3 on entrance of the courier within conduit section 22 essentially precludes forced air exhaustion through outlet 25 and no blast of air will be present upon discharge of a courier. Thus, the courier discharge unit will not produce a blast of air which might disturb proximate work positions.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. In a pneumatic courier system, a courier discharge unit for receiving couriers from a courier conveying conduit within the system and directing the couriers into a shoe, said courier discharge unit comprising:
   a. a housing having an input conduit and an outlet for accommodating passage of couriers therethrough;
   b. a conduit section disposed within said housing and interconnecting said input conduit and said courier outlet for transporting the couriers from said input conduit to said courier outlet;
   c. a pivotable plate latchable to a first position for sealing said courier outlet to define a closed end cavity within said conduit section and operable to a second position to permit discharge of couriers through said courier outlet into the shoe, said plate including a counterweight for biasing said plate to said first position;

d. a necked length of said input conduit to reduce the diameter thereof, said conduit section being of a diameter equivalent to the reduced diameter of said input conduit, for restricting air blowby intermediate the courier and the wall of said conduit section and establishing an air pressure buildup intermediate said plate and the approaching end of the courier;

e. latch means responsive to travel of a courier in proximity thereto for releasing said plate from said first position, said latch means comprising: a depending pivotable latch having a lip for engaging said plate and maintaining said plate adjacent said courier outlet; and a lobe extending from said latch into said conduit section for urging pivotal movement of said latch upon passage of a courier therepast;

f. a plurality of apertures disposed within said conduit section for directing a flow of air from said input conduit into an envelope defined by said housing and said conduit section; and g. an outlet conduit for exhausting the flow of air entering the envelope within said housing;

whereby, the momentum of a courier entering said courier discharge unit is retarded by an air pressure buildup within said conduit section prior to discharge of the courier through said courier outlet into the shoe while retaining the integrity of the flow of air through the pneumatic courier system.

2. The courier discharge unit as set forth in claim 1 including adjustable pivot means for modifying the pivot point of said plate with respect to said courier outlet.

3. The courier discharge unit as set forth in claim 1 including adjustable pivot means for modifying the pivot point of said latch.

4. The courier discharge unit as set forth in claim 1 including an annular seal circumscribing said courier outlet adjacent said plate for establishing a seal intermediate said conduit section and said plate.

5. The courier discharge unit as set forth in claim 1 wherein the internal diameter of said input conduit is reduced from a standard 4 ⅜ inches to 4.28 inches.

* * * * *